Figure 1:
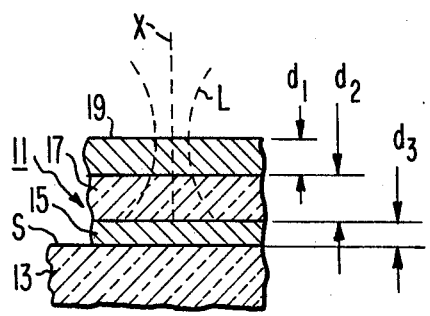

United States Patent [19]

Bell et al.

[11] 4,222,071
[45] Sep. 9, 1980

[54] SENSITIVITY INFORMATION RECORD

[75] Inventors: Alan E. Bell, East Windsor; Robert A. Bartolini, Trenton, both of N.J.

[73] Assignee: RCA Corporation, New York, N.Y.

[21] Appl. No.: 972,408

[22] Filed: Dec. 22, 1978

[51] Int. Cl.³ .................... H04N 5/76; G11B 7/00; G01D 15/10; G01D 15/24
[52] U.S. Cl. .................... 358/128.5; 179/100.3 V; 346/76 L; 346/137
[58] Field of Search ............... 358/128; 179/100.3 V; 346/76 L, 135, 137

[56] References Cited

U.S. PATENT DOCUMENTS

| | | | |
|---|---|---|---|
| 3,665,483 | 5/1972 | Becker et al. | 346/76 L |
| 4,023,185 | 5/1977 | Bloom et al. | 358/128 |
| 4,069,487 | 1/1978 | Kasai et al. | 346/76 L |
| 4,097,895 | 6/1978 | Spong | 358/128 |

OTHER PUBLICATIONS

B. J. Greenblott, "High Density Recording by Vaporization of Film Areas", IBM Tech. Disclosure Bulletin, vol. 14, No. 8, Jan. 1972, p. 2358.
"A Prototype Optical Disc Recorder", Digest of Technical Papers for the Conference on Laser Engineering and Applications, (CLEA), Paper 4.6, p. 15, Jun. 1-3, 1977.

*Primary Examiner*—Daryl W. Cook
*Attorney, Agent, or Firm*—E. M. Whitacre; J. S. Tripoli; J. E. Roehling

[57] ABSTRACT

A flat major surface of a disc-shaped substrate (e.g., glass or plastic) is coated with a light-reflective layer (e.g., aluminum) which is coated with a dielectric material (e.g., silicon dioxide) highly transparent for light of a frequency supplied by a recording laser. The dielectric material is coated with a thin layer of a smooth continuous, low melting point, low thermal diffusion length metal (e.g., tellurium) absorptive for light of the frequencies supplied by the recording laser. The coating parameters are chosen to establish an anti-reflective condition for the coated record blank at the recording light frequency. The light output of the laser, which is intensity modulated in accordance with a signal to be recorded, is focused upon the coated surface of the disc as the disc is rotated. With the peak intensity of the focused light sufficient to at least cause melting of the absorptive layer, an information track is formed as a succession of spaced pits in which, the reflective layer is effectively exposed through the layer of dielectric material. For playback, light of a constant intensity is focused on the information track as the disc is rotated. During playback, the focused light is of insufficient intensity to effect melting of the remaining absorptive layer, but is of a frequency at which the undisturbed regions of the coated disc exhibit an anti-reflective condition. A photo-detector, positioned to receive light reflected from the information track as the pits pass through the path of the focused light, develops a signal representative of the recorded information.

12 Claims, 1 Drawing Figure

SENSITIVITY INFORMATION RECORD

The government has rights in this invention pursuant to Contract No. MDA 904-76-C-0429 awarded by the Department of the Army.

The present invention relates generally to a novel high-density information storage medium. More particularly, this invention relates to an information storage medium suitable for use with optical recording and playback methods and apparatus.

In U.S. patent application Ser. No. 782,032, filed on Mar. 28, 1977 to Alan E. Bell, a record medium is disclosed. The efficient coupling of energy from a recording light beam into an absorptive material coating (necessary for the achievement of an adequate recording sensitivity) is achieved, in the aforementioned Bell application, by construction of the recording medium in the form of a substrate having a surface which is highly reflective (at least, at the frequency of the light forming the recording beam), a layer of material transparent at the recording beam light frequency overlying the reflective surface, and a thin layer of material, highly absorptive at the recording beam light frequency, overlying the transparent layer. With both incident light and reflected light (reflected from the substrate surface through the transparent layer) incident on the thin absorptive layer, the ability to rapidly elevate the temperature of the absorptive layer material to that required for melting to take place is enhanced. Playback of the Bell type record medium permits recovery of recorded video signals with a desirable signal-to-noise ratio (e.g., 45–50 db broadcast quality).

Heretofore, the absorbing material which has produced the best results in the Bell type record medium is titanium. This material has a very high melting point (i.e., 1668° C.). Record media having a titanium absorbing layer require approximately 25 mW of power at the record surface to produce a broadcast quality optical disc. Since the practical optical efficiency of a recording system used to record video information on a record medium is on the order of 20 percent, a laser providing 125 mW of output power must be used. The present state of the art in GaAlAs injection lasers makes it impractical to use a compact GaAlAs injection laser as the recording source on a titanium Bell type record medium.

In accordance with the principles of the present invention, a record medium sensitive to a low-power recording laser (e.g., a GaAlAs injection laser) is provided. In further accordance with the principles of the present invention, a record medium which permits recovery of recorded video signals with a high signal-to-noise ratio (e.g., b 45–50 db broadcast quality is provided.

Pursuant to one aspect of the present invention, a record medium suitable for use with optical recording and playback methods and apparatus is provided. The record medium comprises a substrate having a light reflecting surface (i.e., reflective at the frequency of the light forming the recording beam). A first coating being substantially transparent at the recording beam light frequency overlies the reflecting surface. A thin second coating which comprises a smooth, continuous, low melting point (i.e., less than 1000° C.), low thermal diffusion length (i.e., less than the recording beam diameter) metal material is light absorptive at the recording beam light frequency. The absorptive coating which overlies said first coating receives light energy corresponding to information to be recorded on said record blank. The thickness of the second coating is so related to the thickness of the first coating and the optical constants of the reflective material and the respective materials of the first coating and the second coating so as to establish an anti-reflective condition for the record medium at the recording beam light frequency. Pursuant to another aspect of the present invention, the second coating is predominantly tellurium.

It was anticipated that substitution of a low melting point metal for the titanium, platinum or rhodium absorptive layer of the Bell type record medium would provide a highly sensitive medium. A test was performed on a selected group of low melting point metals (i.e., germanium, aluminum, lead, bismuth, indium and tellurium). With the exception of aluminum, the sensitivity of the record medium increased with the reduction in the melting point of these metals as compared to titanium (as illustrated in Table I).

TABLE I

| Metal | Threshold (mW) | Sig-to-Noise (Max.db) | Power (Max. Sig-to-Noise mW) | Thermal Diffusivity (Cm$^2$/sec) | Melting (°C.) |
|---|---|---|---|---|---|
| Ti | 12 | 54 | 25 | .08 | 1668 |
| Ge | 9 | 38 | >40 | .36 | 937 |
| Al | 15 | 43 | 80 | .86 | 660 |
| Pb | 3 | 36 | 15 | .02 | 327 |
| Bi | 3 | 41 | 9 | .06 | 271 |
| In | 5 | 40 | 25 | .14 | 156 |
| Te | 3 | 50 | 6 | .05 | 450 |

High sensitivity, however, is only one of the attributes sought in a broadcast quality optical recorder/play back apparatus. Also of significant importance is the signal-to-noise ratio obtained in the playback of the record medium. An examination of Table I indicates an unexpectedly high playback signal-to-noise ratio (i.e., 50 db) in the case of tellurium. The other five metals provide a signal-to-noise ratio of approximately 40 db which is not generally considered adequate for broadcast quality.

The performance of the tellurium record medium is uncharacteristic of the general class of low melting point metals which were tested. The results obtained by using tellurium in the record medium were unexpected. The signal-to-noise ratio of the tellurium record medium exceeds broadcast requirements at a recording power which is less than ¼ of the recording power necessary to record on a titanium record medium. Such a reduction in power makes recording with a GaAlAs injection laser feasible.

The reason why the tellurium structure of the present invention out-performs the general class of low melting point metal structures is not completely clear. The surface quality and low thermal diffusion length of a thin layer of tellurium may be characteristics which affect the sensitivity and signal-to-noise ratio of a record medium. A thin layer of tellurium evaporated on a flat, polished disc has a surface which is specular at the recording beam light frequency, being textureless, grainfree and continuous on a microscopic scale. Generally, with the exception of tellurium, the low melting point metals tested were not continuous in an evaporated thin (i.e., 50-100Å) film form, rather, they consisted of microscopic agglomerates. This inherent texture seems to result in a significant reduction in the playback signal-to-noise ratio.

For a group of materials having the same melting point it is believed that the relative sensitivity of a record medium is dependent upon the thermal diffusion length ($l = \sqrt{\kappa \tau}$ where $\kappa$ is the thermal diffusivity and $\tau$ is the exposure time) of the absorptive layer. Tellurium, which has excellent sensitivity, has a thermal diffusion length of 0.5 microns for a 50 ns exposure to a recording beam of 1 micron diameter at the record surface, while aluminum, which has poor sensitivity, has a thermal diffusivity length of 2.1 microns. From the test results of the selected group of metals, it is believed that a thin layer of a low thermal diffusion length metal (i.e., a diffusion length of less than the spot size diameter of the recording beam at the record surface) provides a highly sensitive record medium.

In an illustrative recording system (e.g., of the type described in U.S. pat. No. 4,097,895 to F. W. Spong issued on June 27, 1978) a record blank of a disc form is subjected to rotation at a constant rotational speed while a beam of light from a light source (i.e., a laser, providing light at a frequency at which the anti-reflective condition is obtained) is focused on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect melting of the absorptive material and a low level insufficient to effect such melting, the frequency of the level alternations varying as the video signals amplitude changes.

An information track comprising a succession of spaced pits is thus formed in the coated surface of the disc. The pits appearing in those surface regions exposed to the high level beam, due to melting of the absorptive layer material in response to the high level beam exposure with variations in the length and separation of the pits, are representative of the recorded information. Where a continuous sequence of pictures is to be recorded, a spiral information track may be formed by providing relative motion, in a radial direction and at a constant rate during the recording, between the recording beam and the rotating disc. Alternatively, in the absence of such relative motion during the recording, a circular information track may be formed, appropriate for "slide" recording purposes.

The result of the above-described recording process is the formation of an information record of a form which facilitates recovery of the recorded information by optical playback processes. The information track of such an information record comprises (1) undisturbed surface regions that exhibit very low reflectance at an appropriate light frequency (due to the anti-reflective thickness choice described previously), alternating with (2) pit regions, formed by the melting process, that exhibit appreciably higher reflectance at the same light frequency (due to complete, or at least partial, removal of the absorptive layer covering of the transparent layer and the reflective surface of the substrate, ensuring departure from the anti-reflective condition). A high ratio between the reflectance of the pit regions and the reflectance of the intervening (undisturbed surface) regions is readily provided.

In playback operations, a light beam is focused upon the information track of a rotating information record of the above-described type embodying the principles of the present invention. The playback beam has a constant intensity at a level insufficient to effect melting of the disc coatings, and is of a frequency substantially corresponding to that at which the undisturbed surface regions exhibit an anti-reflection condition. A photodetector, positioned to receive light reflected from the successive regions of the information track as they pass through the path of the focused light, develops a signal representative of the recorded information. A high readout contrast ratio (due to the large differences in reflectance of the pit regions and the intervening track regions, at the light frequency of the playback beam) is readily obtained, permitting recovery of the recorded video signals with an excellent signal-to-noise ratio.

Figure 2:
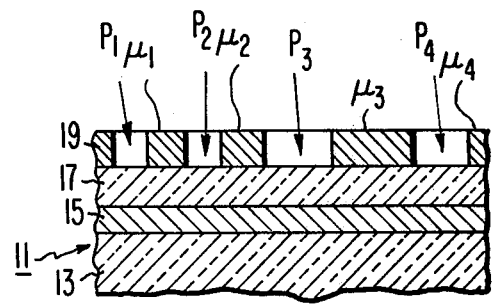
Figure 3:
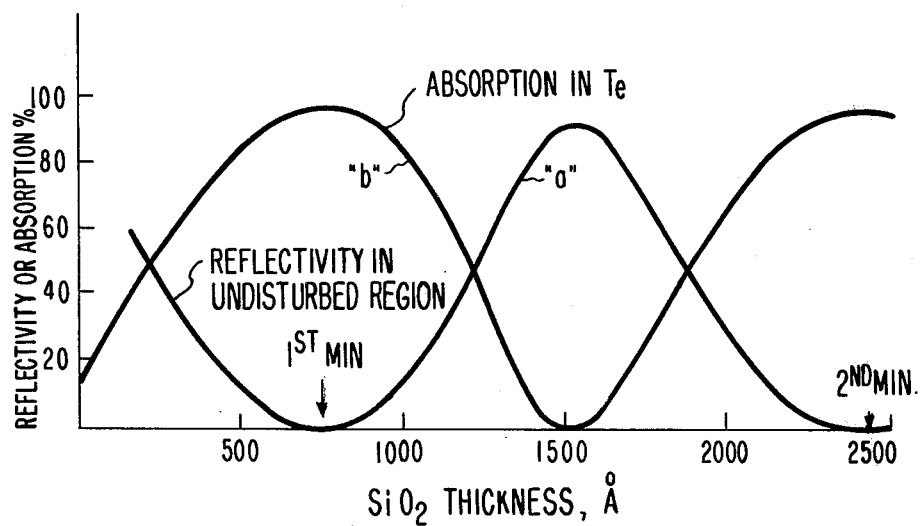

In the accompanying drawings:

FIG. 1 provides a cross-sectional view of a portion of a recording medium, exhibiting a construction in accordance with principles of the present invention;

FIG. 2 illustrates a cross-sectional view of a portion of the information track of an information record formed from a recording medium of the type shown in FIG. 1 pursuant to principles of the present invention; and FIG. 3 provides a graph of the relationship between dielectric layer thickness and reflectance for an illustrative form of the recording medium of FIGS. 1 and 2.

In FIG. 1, a cross-sectional view of a portion of a record blank 11, formed for use in an optical recording system, shows the construction of a recording medium pursuant to an illustrative embodiment of the present invention. The record blank 11 includes a substrate 13, which is illustratively formed in the shape of a disc, a major surface (s) of which is processed to be polished and flat. Desirably, the substrate 13 is formed of a material, such as glass or plastic which may be conveniently processed to achieve such surface.

Overlying the surface "s" of the substrate 13 is a thin layer 15 of a material exhibiting a high reflectivity (over at least a given portion of the light spectrum). Illustratively, the reflecting layer 15 is formed of a metal, such as a 600Å layer of aluminum, deposited on the surface "s" by an evaporation process.

Overlying the reflecting layer 15 is a layer 17 of material which is light transparent (at least over the aforementioned given portion of the light spectrum). Illustratively, the transparent layer 17 is formed of a dielectric material, such as a 750Å layer of silicon dioxide, deposited on the reflecting layer 15 by an evaporation process.

Finally, overlying the transparent layer 17 is a thin layer 19 of material which is light absorptive at least over the aforementioned given portion of the light spectrum. Illustratively, the absorptive layer is formed of a thin layer of a continuous, smooth, low melting point, low thermal diffusion length metal, such as a 35Å layer of tellurium, deposited on the transparent layer 17 by an evaporation process.

An advantage of the use, in the illustrated construction of the recording medium, of a thin absorptive layer overlying a transparent layer which in turn overlies a reflective surface will be recognized by consideration of the effect achieved when a light beam L (of a frequency in the aforementioned given portion of the spectrum) å is directed along an axis (x) normal to the surface "s", and focused at or near the surface of the absorptive layer 19. Most of that portion of the incident light which reaches the interior boundary of the absorptive layer 19 is not "lost" through transmission into the substrate 13, as would occur in the absence of the reflecting layer 15, but rather is reflected back through the transparent layer 17 into the absorptive layer 19. The consequence is exposure of the absorptive layer 19 to both incident and reflected light. Where it is desired to effect surface melting in response to recording light exposure, this avoidance of transmission losses into the interior of the recording medium increases the coupling efficiency of energy from the recording light beam into the absorptive material enhancing recording sensitivity. While a similar avoidance of transmission losses into the interior of the recording medium would be achieved by forming a thicker absorptive layer (i.e., increasing the reflectance thereof), the transmission loss avoidance would be offset by high reflection losses.

For optimum efficiency of coupling of energy from the recording light beam L into the absorptive layer 19, reflection losses are desirably reduced to a low level by choosing the thickness ($d_1$) of the absorptive layer 19, with relation to the thickness ($d_2$) of the transparent layer 17, the thickness ($d_3$) of the reflecting layer 15 and the optical constants of the elements of the system 19-17-15-13, to establish a so-called anti-reflective condition for the system at the recording beam frequency. The achievement of an anti-reflective effect by use of thin films of appropriate thickness and optical properties is well known, per se, and applications of the effect with films of transmissive materials are widespread in optical equipment. Formulae which may be used in arriving at parameter combinations for the absorptive media (19, 17, 15) of the FIG. 1 system that result in the desired anti-reflective condition are well known in the art and a presentation thereof may be found in the above mentioned Spong patent.

When the intensity of the focused light beam L is of sufficient magnitude, material of the absorptive layer 19 is elevated to a melting temperature, and melting of the material occurs, forming a pit in the surface of the record blank 11. With suitable modulation of the intensity of the beam I in accordance with a recording signal, as successive regions of the record blank 11 pass through the beam path, an information track may be formed comprising spaced pits in regions of the absorptive layer subject to the high intensity beam exposure, separated by undisturbed regions of the absorptive layer (that were not subject to such high intensity beam exposure).

FIG. 2 illustrates a portion of an information record formed when the record blank 11 of FIG. 1 is subjected to such controlled beam exposure. As shown in cross-section in FIG. 2, the information track comprises a succession of spaced pits $p_1, p_2, p_3, p_4$, separated by regions ($u_1, u_2, u_3, u_4$) in which the surface of the absorptive layer 19 is undisturbed. For illustrative purposes, the dept of each pit is shown as being equal to the thickness of the absorptive layer 19, whereby the reflective layer 15 is wholly uncovered through the transparent layer 17 in the pit regions. While such a depth of melting may desirably result in maximization of the readout contrast ratio, it is not essential for playback results when a lower signal-to-noise ratio can be tolerated. Thus, in an acceptable alternative to the illustrated form of information record, a residual portion of the absorptive material (with a thickness, of course, less than $d_1$) may overlie the transparent layer 17 in the pit bottoms.

When the light frequency of a playback beam provided by a laser falls in the given spectrum portion for which the disc's layer 19 is highly absorptive and for which the disc's layer 15 is highly reflective, and at or close to the frequency at which the undisturbed regions of the system 19-17-15-13 exhibit the anti-reflective effect, a high readout contrast ratio is realized, permitting video signal recovery with an excellent signal-to-noise ratio. Illustratively, with use of a deviation range of 7–10 Mhz, color television signals of an NTSC format have been recovered with a video signal-to-noise ratio of 45–50 (peak-to-peak video to rms noise) for a video bandwidth of 5 MHz.

Curve "a" of the graph of FIG. 3 shows that the computed minimum reflectance (D min.) for the illustrative system parameter choices (i.e., layer 15 being 600Å thick Al layer, layer 19 being a 35Å thick layer of Tellurium, substrate 13 being glass and coherent light beam L having a frequency of 4880Å for the system of FIG. 1) occurs at a dielectric layer thickness given by the following equation:

$$D_{min} = 750\text{Å} + n\ 1670\text{Å}$$

where n is zero or a positive integer. Thus, when a choice for the Dmin thickness of the dielectric layer (e.g., 750Å value) is associated with the illustrative system parameter choices, the record blank of FIG. 1 (and the non-depressed regions of the information record of FIG. 2) exhibits an anti-reflective condition for the laser frequency corresponding to a wavelength of 4880Å.

It may be advantageous in one embodiment (i.e., an aluminum reflective layer) to select a dielectric layer thickness where n=1. A thicker dielectric layer provides a greater thermal barrier which is desirably juxtaposed between the tellurium absorptive layer and the thermally conductive aluminum reflective layer.

Curve "b" shows absorption of a 35Å thick tellurium layer, for the illustrative system parameter choices for the system of FIG. 1, when computed as a function of dielectric layer thickness.

While the principles of the present invention have been demonstrated with particular regard to the illustrative structures of FIGS. 1 and 2, it will be recognized that various departures from such illustrative structures may be undertaken in practice of the invention. For example, the substrate itself may be formed of material having high reflectivity, eliminating the need for employing a separate reflecting layer in forming a reflective surface underlying the transparent layer. Furthermore, while the invention was particularly described by examples where the dielectric layer was formed of a silicon dioxide material having a thickness of 750Å, other dielectric materials and thicknesses may be used. Likewise, the anti-reflective condition for the disc medium can be obtained, through application of the principles of the present invention, by varying the thickness of the absorptive layer. If all of the parameters are properly modified, an absorptive layer (i.e. a predominantly tellurium layer) of up to 200Å thickness will provide improved sensitivity and signal-to-noise ratio. For another example, the tellurium layer may be overcoated or alloyed with other metals to provide a disc surface which is not susceptible to dust particles or subjected to degradation respectively. It should also be appreciated that other forms of optical recording may use the advantageous record blank structure described herein. Finally, it should be appreciated that a record medium in accordance with the principles of the present invention could be designed for almost any wavelength of a recorder/playback laser. A tellurium anti-reflective record medium has been designed through application of the principles of the present invention for a wavelength of 8000Å, the operating wavelength of a GaAlAs injection laser, having a reflectivity of less than 2% (i.e., a tellurium layer thickness of 60Å, a silicon dioxide layer thickness of 525Å, and a 600Å thick layer of aluminum coated on a plastic substrate).

What is claimed is:

1. A record blank for use with a recording laser providing a light beam at a given frequency; said record blank comprising the combination of: a substrate having a light reflecting surface at said given frequency; a first coating overlying said light reflecting surface, said first coating being substantially transparent at said given frequency for permitting at least a portion of said laser light beam to pass through said first coating to said light reflecting surface; and a second coating overlying said first coating, said second coating comprising a material which is light absorptive at said given frequency, for receiving light energy corresponding to information to be recorded on said record blank; the thickness of said second coating being such that said second coating is partially transmissive to light at said given frequency and being so related to the thickness of said first coating, and the optical constants of said reflective surface and the respective materials of said first coating and said second coating so as to establish a substantially anti-reflective condition for said record blank at said given frequency with respect to the light beam incident on said second coating; the improvement which comprises: employing a smooth, continuous, low melting point, low thermal diffusion length metal as said second coating.

2. A record blank according to claim 1 wherein said metal of said second coating has a melting point of less than 1000° C.

3. A record blank according to claim 1 wherein said metal of said second coating has a thermal diffusion length of less than the recording laser beam diameter used for recording on said record blank.

4. A record plank according to claim 1 wherein said metal is predominantly tellurium.

5. A record blank according to claim 4 wherein said metal coating has a thickness of less than 200Å.

6. A record blank according to claim 4 wherein said first coating comprises a layer of silicon dioxide and wherein said light reflecting surface comprises a layer of aluminum.

7. An information record for use in playback apparatus employing a playback beam of light of a given frequency; said record comprising the combination of: a substrate having a light reflecting surface at said given frequency; a first coating overlying said light reflecting surface, said first coating being substantially transparent at said given frequency for permitting at least a portion of said coherent light beam to pass through said first coating to said light reflecting surface; and a second coating overlying said first coating, said second coating comprising a material which is light absorptive at said given frequency and said second coating having an information track formed therein; wherein said information track comprises a succession of space pits, with variations in the spacing between successive pit edges representative of recorded information; wherein the thickness of said second coating in all regions other than those occupied by said pits is such that said second coating is partially transmissive to light of said given frequency and is so related to the thickness of said first coating and the optical constants of said reflective surface and the respective materials of said first coating and said second coating so as to establish a substantially anti-reflective condition for all of said non-pit regions at said given frequency with respect to the light beam incident on said second coating; and wherein the thickness of said second coating in those regions occupied by said pits is less than the thickness required to establish an anti-reflective condition in said pit regions; the improvement which comprises: employing a smooth, continuous, low melting point, low thermal diffusion length metal as said second coating.

8. An information record according to claim 7 wherein said metal of said second coating has a melting point of less than 1000° C.

9. An information record according to claim 7 wherein said metal of said second coating has a thermal diffusion length of less than the recording laser beam diameter used for recording on said information record.

10. An information record according to claim 7 wherein said metal is predominantly tellurium.

11. An information record according to claim 10 wherein said metal coating has a thickness of less than 200Å.

12. An information record according to claim 10 wherein said first coating comprises a layer of silicon dioxide and wherein said light reflecting surface comprises a layer of aluminum.

* * * * *

UNITED STATES PATENT AND TRADEMARK OFFICE
CERTIFICATE OF CORRECTION

PATENT NO. : 4,222,071

DATED : 9-9-80

INVENTOR(S) : Alan E. Bell et al.

It is certified that error appears in the above-identified patent and that said Letters Patent is hereby corrected as shown below:

Col. 1, line 54, omit "b" which occurs between "e.g.," and "45".

Col. 1, line 54, add --)-- after "quality".

Col. 2, line 35, "play back" should read --playback--.

Col. 3, line 32, "signals" should read --signal--.

Col. 4, line 62, after "spectrum" and before ")", insert --illustratively 4880 Å--.

Col. 4, line 62, after ")" omit "å".

Col. 5, line 40, "I" should be --L--.

Col. 8, line 12, "space" should read --spaced--.

Signed and Sealed this

Sixteenth Day of December 1980

[SEAL]

Attest:

SIDNEY A. DIAMOND

Attesting Officer

Commissioner of Patents and Trademarks